United States Patent
Kang et al.

(10) Patent No.: US 10,450,453 B2
(45) Date of Patent: Oct. 22, 2019

(54) THERMOPLASTIC GRAFT COPOLYMER RESIN, METHOD OF PREPARING THE SAME, AND THERMOPLASTIC RESIN COMPOSITION INCLUDING THE SAME

(71) Applicant: LG CHEM, LTD., Seoul (KR)

(72) Inventors: Eun Soo Kang, Daejeon (KR); Yong Yeon Hwang, Daejeon (KR); Hyun Taek Oh, Daejeon (KR); Min Jung Kim, Daejeon (KR); Chun Ho Park, Daejeon (KR); Sang Mi Lee, Daejeon (KR); Yeong Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 61 days.

(21) Appl. No.: 15/570,274

(22) PCT Filed: Nov. 29, 2016

(86) PCT No.: PCT/KR2016/013911
§ 371 (c)(1),
(2) Date: Oct. 27, 2017

(87) PCT Pub. No.: WO2017/099409
PCT Pub. Date: Jun. 15, 2017

(65) Prior Publication Data
US 2018/0142094 A1    May 24, 2018

(30) Foreign Application Priority Data
Dec. 10, 2015  (KR) .................. 10-2015-0175586

(51) Int. Cl.
| | |
|---|---|
| *C08L 51/04* | (2006.01) |
| *C08J 3/24* | (2006.01) |
| *C08L 25/12* | (2006.01) |
| *C08J 3/12* | (2006.01) |
| *C08K 5/00* | (2006.01) |
| *C08K 5/04* | (2006.01) |

(52) U.S. Cl.
CPC .................. *C08L 51/04* (2013.01); *C08J 3/12* (2013.01); *C08J 3/24* (2013.01); *C08K 5/00* (2013.01); *C08K 5/04* (2013.01); *C08L 25/12* (2013.01); *C08J 2300/22* (2013.01)

(58) Field of Classification Search
CPC .................................................... C08L 51/04
See application file for complete search history.

(56) References Cited

U.S. PATENT DOCUMENTS

| | | | | |
|---|---|---|---|---|
| 4,753,988 A | * | 6/1988 | Henton ............... | C08L 25/12 525/193 |
| 6,720,398 B2 | * | 4/2004 | Hogt ................... | C08F 4/34 526/232.5 |
| 2001/0021735 A1 | * | 9/2001 | Schulz ................ | C03C 25/32 524/155 |
| 2006/0089462 A1 | | 4/2006 | O et al. | |
| 2014/0107276 A1 | * | 4/2014 | Kim .................... | C08L 67/02 524/504 |
| 2015/0011709 A1 | | 1/2015 | Ahn et al. | |
| 2015/0274944 A1 | * | 10/2015 | Hogan ................ | C08F 236/10 524/526 |
| 2017/0137620 A1 | * | 5/2017 | Iwanaga ............. | C08F 285/00 |

FOREIGN PATENT DOCUMENTS

| | | |
|---|---|---|
| JP | 2002-530494 A | 9/2002 |
| KR | 10-0833763 B1 | 5/2008 |
| KR | 10-2009-0067965 A | 6/2009 |
| KR | 10-1285494 B1 | 7/2013 |
| KR | 101285494 B1 | 7/2013 |
| KR | 10-2013-0090307 A | 8/2013 |
| KR | 10-2014-0096748 A | 8/2014 |
| WO | 2007142473 A1 | 12/2007 |

OTHER PUBLICATIONS

International Search Report for PCT/KR2016/013911 filed on Nov. 29, 2016.
Extended European Search Report for application No. 16873274.1, dated Dec. 12, 2018.

* cited by examiner

*Primary Examiner* — Jeffrey C Mullis

(57) ABSTRACT

The present disclosure relates to a thermoplastic graft copolymer resin, a method of preparing the same, and a thermoplastic resin composition including the same. More particularly, the present invention relates to a thermoplastic graft copolymer resin including a seed, an alkyl acrylate rubber core enclosing the seed, and a shell enclosing the rubber core, a method of preparing the same, and a thermoplastic resin composition including the same, wherein the thermoplastic graft copolymer resin has a gel content of 93% by weight or more and a swelling index of 6 to 14. In accordance with the present disclosure, a thermoplastic graft copolymer resin exhibiting excellent chemical resistance, heat resistance, and impact resistance, a method of preparing the same, and a thermoplastic resin composition including the same are provided.

18 Claims, No Drawings

THERMOPLASTIC GRAFT COPOLYMER RESIN, METHOD OF PREPARING THE SAME, AND THERMOPLASTIC RESIN COMPOSITION INCLUDING THE SAME

CROSS-REFERENCE TO RELATED APPLICATION

This application is a U.S. National Stage of PCT/KR2016/013911 filed Nov. 29, 2016, which claims the benefit of Korean Patent Application No. 10-2015-0175586 filed on Dec. 10, 2015 with the Korean Intellectual Property Office, the disclosures of which are herein incorporated by reference in their entirety.

TECHNICAL FIELD

The present invention relates to a thermoplastic graft copolymer resin, a method of preparing the same, and a thermoplastic resin composition including the same. More particularly, the present invention relates to a thermoplastic graft copolymer resin exhibiting excellent chemical resistance, heat resistance, and impact resistance, a method of preparing the same, and a thermoplastic resin composition including the same.

BACKGROUND ART

An acrylonitrile-butadiene-styrene (ABS) copolymer resin (hereinafter referred to as "ABS resin") is a styrene-based copolymer widely used in the industry. Such an ABS resin exhibits excellent impact resistance, chemical resistance, colorability and molding processability, thereby being widely used as a material, particularly, for automobile interior materials, automobile components, office equipment, electric/electronic components, and the like.

However, since a butadiene rubber of an ABS resin includes an ethylenic unsaturated group, it is easily oxidized by ultraviolet light, visible light, or heat in the presence of oxygen. Accordingly, an appearance and color of the resin are changed and mechanical properties thereof are deteriorated, which are great limitations in using the same as an exterior material.

An acrylate-styrene-acrylonitrile (ASA) tercopolymer resin includes an acrylic rubber, in which an ethylenic unsaturated group is absent, instead of a butadiene rubber, thereby exhibiting superior mechanical properties and excellent weather resistance and aging resistance. In particular, an ASA tercopolymer resin is widely used in electric/electronic components used for outdoor use, construction materials, automobile interior and exterior materials, vessel interior and exterior materials, leisure goods, garden equipment, and the like. However, a thermoplastic resin having further improved impact resistance, chemical resistance, and heat resistance than a conventional ASA resin is required in the market. Accordingly, research into development of a thermoplastic resin in which all of the properties are improved is actively underway.

RELATED ART DOCUMENT

[Patent Document] Japanese Patent Application Publication No. 2002-530494

DISCLOSURE

Technical Problem

Therefore, the present invention has been made in view of the above problems, and it is one object of the present invention to provide a thermoplastic graft copolymer resin exhibiting excellent chemical resistance, heat resistance, and impact resistance, a method of preparing the same, and a thermoplastic resin composition including the same.

The above and other objects can be accomplished by the present disclosure described below.

Technical Solution

In accordance with one aspect of the present invention, provided is a thermoplastic graft copolymer resin, including a seed, an alkyl acrylate rubber core enclosing the seed, and a shell enclosing the rubber core, wherein the thermoplastic graft copolymer resin has a gel content of 93% by weight or more and a swelling index of 6 to 14.

The thermoplastic graft copolymer resin may include, for example, 1 to 20% by weight of the seed, 5 to 40% by weight of the rubber core, and 40 to 90% by weight of the shell based on a total of used monomers.

The seed may be, for example, a rubber seed.

The rubber seed may be, for example, a rubber polymer prepared by polymerizing alkyl acrylate, a crosslinking agent, and a grafting agent.

The crosslinking agent used in the rubber seed may be included, for example, in an amount of 0.01 to 3 parts by weight, or 0.05 to 0.3 parts by weight based on 100 parts by weight of a total of monomers used in the copolymer resin.

The grafting agent used in the rubber seed may be included, for example, in an amount of 0.01 to 3 parts by weight, or 0.05 to 0.3 parts by weight based on 100 parts by weight of a total of monomers used in the copolymer resin.

The rubber seed may be, for example, a rubber polymer prepared by polymerizing alkyl acrylate, a crosslinking agent, and a grafting agent.

The cyclic polymerization initiator used in the rubber seed may be included, for example, in an amount of 0.01 to 3 parts by weight, or 0.1 to 0.5 parts by weight based on 100 parts by weight of a total of monomers used in the copolymer resin.

The rubber core may be, for example, a rubber polymer prepared by polymerizing alkyl acrylate, a crosslinking agent, and a grafting agent.

The crosslinking agent used in the rubber core may be included, for example, in an amount of 0.01 to 3 parts by weight, or 0.01 to 0.2 parts by weight based on 100 parts by weight of a total of monomers used in the copolymer resin.

The grafting agent used in the rubber core may be included, for example, in an amount of 0.01 to 3 parts by weight, or 0.01 to 0.2 parts by weight based on 100 parts by weight of a total of monomers used in the copolymer resin.

The rubber core may be, for example, a rubber polymer prepared by polymerizing alkyl acrylate and a cyclic polymerization initiator.

The cyclic polymerization initiator used in the rubber core may be included, for example, in an amount of 0.01 to 3 parts by weight, 0.05 to 1 parts by weight, or 0.1 to 0.5 parts by weight based on 100 parts by weight of a total of monomers used in the copolymer resin.

For example, a peroxide group of the cyclic polymerization initiator may form a portion of a ring.

The cyclic polymerization initiator may include, for example, one or five peroxide groups.

The cyclic polymerization initiator may be, for example, one or more selected from the group consisting of dioxylane, 3,6-dichloro-3,6-dimethyl-[1,2,4,5]tetroxane, formaldehyde diperoxide, 3,6-dimethyl-[1,2,4,5]tetroxane, 1,2,4,5,7,8-hexaoxonane, 3,6,9-triethyl-[1,2,4,5,7,8]hexoxonane, 3,6,9-trimethyl-1,2,4,5,7,8-hexaoxonane, 3,6,9-triethyl-3,6,9-trimethyl-[1,2,4,5,7,8]hexoxonane, [1,2,4,6,7,9]hexoxecane, 3,5,8,10-tetramethyl-[1,2,4,6,7,9]hexoxecane, 3,6,9,12-tetramethyl-1,2,4,5,7,8,10,11-octaoxa-cyclododecane, acetone peroxide, 3,3,6,6,9,9,12,12-octamethyl-1,2,4,5,7,8,10,11-octaoxa-cyclododecane, and 3,9-dihexyl-1,2,4,5,7,8,10,11-octaoxa-cyclododecane.

The cyclic polymerization initiator may be included, for example, in an amount of 0.01 to 3 parts by weight based on 100 parts by weight of a total of used monomers.

The crosslinking agent may be, for example, one or more selected from the group consisting of divinylbenzene, 3-butanediol diacrylate, 1,3-butanediol dimethacrylate, 1,4-butanediol diacrylate, 1,4-butanediol dimethacrylate, allyl acrylate, trimethylolpropane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triallylamine, and diallylamine.

The grafting agent may be, for example, one or more selected from the group consisting of allyl methacrylate, triallyl isocyanurate, triallylamine, and diallylamine.

The crosslinking agent may be included, for example, in an amount of 0.01 to 3 parts by weight based on 100 parts by weight of a total of used monomers.

The grafting agent may be included, for example, in an amount of 0.01 to 3 parts by weight based on 100 parts by weight of a total of used monomers.

The rubber core including the seed may have, for example, an average particle diameter of 0.06 to 2 μm.

The shell may be, for example, a polymer prepared by polymerizing one or more selected from the group consisting of an aromatic vinyl compound, a vinyl cyanide compound, and an alkyl (meth)acrylate compound.

The shell may be, for example, a non-crosslinked shell.

In accordance with another aspect of the present invention, provided is a method of preparing a thermoplastic graft copolymer resin, the method including a) a step of preparing a rubber core by emulsion-polymerizing a seed, alkyl acrylate, a crosslinking agent, a grafting agent, and a cyclic polymerization initiator; and b) a step of preparing a shell by adding one or more selected from the group consisting of an aromatic vinyl compound, a vinyl cyanide compound, and an alkyl (meth)acrylate compound to the prepared rubber core and performing emulsion polymerization.

For example, an activator may be further included in emulsion polymerization of step a), step b), or steps a) and b).

In accordance with yet another aspect of the present invention, provided is a thermoplastic resin composition including 5 to 70% by weight of the thermoplastic graft copolymer resin and 30 to 95% by weight of an aromatic vinyl compound-vinyl cyanide compound copolymer.

Advantageous Effects

As apparent from the fore-going, the present invention advantageously provides a thermoplastic graft copolymer resin exhibiting excellent chemical resistance, heat resistance, and impact resistance, a method of preparing the same, and a thermoplastic resin composition including the same.

BEST MODE

Hereinafter, the present disclosure is described in detail.

The present inventors confirmed that, when a particle diameter of an alkyl acrylate rubber core is controlled and a gel content and swelling index of the rubber core are adjusted using a cyclic polymerization initiator upon preparation of a thermoplastic graft copolymer resin, a thermoplastic graft copolymer resin having improved impact resistance, heat resistance, and chemical resistance, compared with a conventional ASA copolymer resin, may be prepared, thus completing the present invention.

The thermoplastic graft copolymer resin of the present disclosure includes a seed, an alkyl acrylate rubber core enclosing the seed, and a shell enclosing the rubber core, wherein the thermoplastic graft copolymer resin has a gel content of 93% by weight or more and a swelling index of 6 to 14.

The seed may have, for example, an average particle diameter of 50 to 1,000 nm, 100 to 800 nm, or 500 to 700 nm. Within this range, a uniform size may be obtained.

The rubber core including the seed may have, for example, an average particle diameter of 0.06 to 2 μm, 0.1 to 1.5 μm, or 0.9 to 1.2 μm. Within this range, impact resistance is improved.

The shell including the seed and the core may have, for example, an average particle diameter of 0.3 to 2.5 μm, 0.5 to 1.5 μm, or 1.3 to 1.5 μm. Within this range, compatibility with a matrix increases.

The seed is smaller than the rubber core, and the rubber core is smaller than the shell.

The thermoplastic graft copolymer resin may have, for example, a gel content of 93 to 98% by weight or 95 to 97% by weight. Within this range, impact strength and the like are superior.

The thermoplastic graft copolymer resin may have, for example, a swelling index of 7 to 10, or 7 to 8. Within this range, impact strength and the like are superior.

The thermoplastic graft copolymer resin may include, for example, 1 to 10% by weight or 3 to 7% by weight of the seed, 20 to 40% by weight or 30 to 40% by weight of the rubber core, and 50 to 80% by weight or 55 to 65% by weight of the shell based on a total of used monomers. Within this range, impact resistance is excellent.

A method of preparing the thermoplastic graft copolymer resin may include, for example, based on 100 parts by weight of a total of used monomers, a) a step of preparing a rubber seed by emulsion-polymerizing 1 to 20 parts by weight of alkyl acrylate, 0.001 to 1 parts by weight of an electrolyte, 0.01 to 3 parts by weight of a crosslinking agent, 0.01 to 3 parts by weight of a grafting agent, 0.01 to 3 parts by weight of a polymerization initiator, 0.01 to 3 parts by weight of an activator, and 0.001 to 3 parts by weight of an emulsifier; b) a step of preparing an alkyl acrylate rubber core with an average particle diameter of 0.06 to 2 μm enclosing the seed by adding 5 to 40 parts by weight of alkyl acrylate, 0.01 to 3 parts by weight of a crosslinking agent, 0.01 to 3 parts by weight of a grafting agent, 0.01 to 3 parts by weight of a cyclic polymerization initiator, 0.01 to 3 parts by weight of an activator, and 0.01 to 7 parts by weight of an emulsifier to the prepared rubber seed and emulsion-polymerizing the same; and c) a step of preparing an alkyl acrylate-aromatic vinyl compound-vinyl cyanide compound graft copolymer resin by adding 40 to 90 parts by weight of a mixture of an aromatic vinyl compound and a vinyl cyanide compound, 0.01 to 3 parts by weight of a polymerization initiator, 0.01 to 3 parts by weight of an activator, and 0.01 to 5 parts by weight of a molecular weight regulator to the alkyl acrylate rubber core and emulsion-polymerizing the same.

In the present disclosure, the expression "monomers" refers to alkyl acrylate, a vinyl cyanide compound, an aromatic vinyl compound, and a comonomer, and is distinguished from a crosslinking agent and a grafting agent.

The alkyl acrylate-aromatic vinyl compound-vinyl cyanide compound graft copolymer resin preferably includes an alkyl acrylate rubber. When the alkyl acrylate rubber core is not included, impact strength rapidly decreases.

The alkyl acrylate-aromatic vinyl compound-vinyl cyanide compound graft copolymer resin includes, for example, an alkyl acrylate-based rubber. The alkyl acrylate-aromatic vinyl compound-vinyl cyanide compound graft copolymer resin may be obtained by graft-polymerizing the alkyl acrylate-based rubber with an aromatic vinyl compound and a vinyl cyanide compound.

The alkyl acrylate rubber may be obtained, for example, by polymerizing, preferably emulsion-polymerizing, an alkyl acrylate compound.

The alkyl acrylate may be, for example, alkyl acrylate wherein an alkyl group includes 1 to 15 carbon atoms. The alkyl acrylate is preferably one or more selected from the group consisting of ethyl acrylate, propyl acrylate, butyl acrylate, hexyl acrylate, octyl acrylate, and 2-ethylhexyl acrylate, more preferably butyl acrylate.

Preferably, the alkyl acrylate rubber polymerized with alkyl acrylate is formed, for example, by polymerizing the alkyl acrylate with a crosslinking agent.

The crosslinking agent may be, for example, a crosslinkable vinyl compound. As a particular example, the crosslinking agent may be one or more selected from the group consisting of divinylbenzene, 3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethylene glycol diacrylate, ethylene glycol dimethacrylate, diethylene glycol dimethacrylate, triethylene glycol dimethacrylate, neopentyl glycol dimethacrylate, triaryl isocyanurate, triallylamine, and diallylamine.

The cyclic polymerization initiator may be, for example, a cyclic peroxide. As a particular example, the cyclic polymerization initiator may be a compound represented by Formula 1 below:

[Formula 1]

wherein R1 may be any substituent capable of satisfying the cyclic structure and may have a structure further including a peroxide. In addition, the number of peroxides in the cyclic structure may be, for example, 1 to 5. Preferably, the number of peroxides in the cyclic structure is 3 to 5. Within this range, impact strength is greatly improved.

A compound satisfying Formula 1 may be, for example, one or more selected from the group consisting of dioxylane, 3,6-dichloro-3,6-dimethyl-[1,2,4,5]tetroxane, formaldehyde diperoxide, 3,6-dimethyl-[1,2,4,5]tetroxane, 1,2,4,5,7,8-hexaoxonane, 3,6,9-triethyl-[1,2,4,5,7,8]hexoxonane, 3,6,9-trimethyl-1,2,4,5,7,8-hexaoxonane, 3,6,9-triethyl-3,6,9-trimethyl-[1,2,4,5,7,8]hexoxonane, [1,2,4,6,7,9]hexoxecane, 3,5,8,10-tetramethyl-[1,2,4,6,7,9]hexoxecane, 3,6,9,12-tetramethyl-1,2,4,5,7,8,10,11-octaoxa-cyclododecane, acetone peroxide, 3,3,6,6,9,9,12,12-octamethyl-1,2,4,5,7,8,10,11-octaoxa-cyclododecane, and 3,9-dihexyl-1,2,4,5,7,8,10,11-octaoxa-cyclododecane.

In addition, as an activator activating the cyclic polymerization initiator, for example, one or more selected from the group consisting of sodium formaldehyde sulfoxylate, sodium ethylenediamine tetraacetate, iron sulfide, dextrose, sodium pyrophosphate, and sodium sulfite may be used.

As the emulsifier, for example, one or more selected from the group consisting of alkali metal salts of alkanesulfonic acid or alkylarylsulfonic acid, alkyl sulfates, fatty alcohol sulfonates, fatty acid salts, resin soaps, and alkali salts of rosin acid may be used.

As a vinyl aromatic monomer constituting the alkyl acrylate-vinyl aromatic compound-vinyl cyanide compound graft copolymer resin, for example, one or more selected from the group consisting of styrene, α-methyl styrene, p-methyl styrene, vinyl toluene and t-butylstyrene may be used. The vinyl aromatic monomer may be used in an amount of 20 to 60% by weight, more preferably 30 to 50% by weight, based on a total weight of the copolymer resin.

As a vinyl cyanide compound constituting the alkyl acrylate-vinyl aromatic compound-vinyl cyanide compound graft copolymer resin, for example, one or more selected from the group consisting of acrylonitrile, methacrylonitrile, and ethacrylonitrile may be used. The vinyl cyanide compound may be used in an amount of 5 to 25% by weight, more preferably 10 to 20% by weight, based on a total weight of the copolymer resin. Within this range, impact strength of a resin composition obtained according to the present disclosure may be highly maintained.

As needed, the alkyl acrylate-vinyl aromatic compound-vinyl cyanide compound graft copolymer resin may further include a (meth)acrylic acid ester compound or a functional monomer as a shell ingredient.

As the molecular weight regulator, for example, mercaptans may be used. Preferably, tertiary dodecyl mercaptan is used.

The molecular weight regulator may be used, for example, in an amount of 0.01 to 5 parts by weight.

The alkyl acrylate-vinyl aromatic compound-vinyl cyanide compound graft copolymer resin is obtained in a latex form after graft polymerization. The obtained latex may be prepared into a powder-type graft copolymer resin, for example, by coagulating with sulfuric acid, $CaCl_2$, $MgSO_4$, or $Al_2(SO_4)_3$, and the like, followed by washing, dehydration, and drying.

A thermoplastic resin composition of the present disclosure includes 5 to 70% by weight of the thermoplastic graft copolymer resin of the present disclosure and 30 to 95% by weight of an aromatic vinyl compound-vinyl cyanide compound copolymer.

In another embodiment, the thermoplastic resin composition of the present disclosure includes 30 to 50% by weight of the thermoplastic graft copolymer resin of the present disclosure and 50 to 70% by weight of an aromatic vinyl compound-vinyl cyanide compound copolymer.

The aromatic vinyl compound-vinyl cyanide compound copolymer refers to a general styrene acrylonitrile-based copolymer. The aromatic vinyl compound-vinyl cyanide compound copolymer may be prepared by bulk-polymerizing a vinyl aromatic monomer with a vinyl cyan monomer. When the bulk polymerization is performed, a batch method or a continuous method may be used. With regard to reaction stability and molecular weight improvement, a continuous method is preferred.

In addition, the aromatic vinyl compound-vinyl cyanide compound copolymer preferably has a weight average molecular weight of 100,000 to 200,000 g/mol or 130,000 to 170,000 g/mol. Within this range, decrease in processability and fluidity may be prevented while maintaining high tensile strength and impact strength. However, the present disclosure is not limited to this range.

As the vinyl aromatic compound, for example, one or more selected from the group consisting of styrene, α-methyl styrene, p-methyl styrene, vinyl toluene, and t-butylstyrene may be used. The vinyl aromatic compound may be used in an amount of 60 to 80% by weight, more preferably 65 to 75% by weight, based on a total weight of the aromatic vinyl compound-vinyl cyanide compound copolymer. Within this range, superior chemical resistance and heat resistance are exhibited.

As the vinyl cyanide compound, for example, one or more selected from the group consisting of acrylonitrile, methacrylonitrile and ethacrylonitrile may be used. More preferably, acrylonitrile is used. The vinyl cyanide compound may be used in an amount of 20 to 40% by weight, more preferably 25 to 35% by weight, based on a total weight of the aromatic vinyl compound-vinyl cyanide compound copolymer. Within this range, superior chemical resistance and heat resistance are exhibited.

When a use amount of each of the vinyl aromatic compound and the vinyl cyanide compound is outside these ranges, the amount of unreacted monomers increases, which is economically or environmentally unpreferable.

The thermoplastic resin composition of the present disclosure having the above composition may be prepared by a general melt-kneading process. The thermoplastic resin composition may further include additives such as an antioxidant, a heat stabilizer, a lubricant, an ultraviolet stabilizer, a lubricant, a release agent, a flame retardant, an antistatic agent, an anti-dripping agent, an inorganic filler, and an impact modifier, as needed, within the purposes of the present disclosure.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

<Seed Preparation>

40 parts by weight of deionized water, 5 parts by weight of butyl acrylate, 0.1 parts by weight of ethylene glycol dimethacrylate as a crosslinking agent, 0.1 parts by weight of allyl methacrylate as a grafting agent, and 0.4 parts by weight of sodium lauryl persulfate were fed into a polymerization reactor to which a heater was connected, and an internal temperature of the polymerization reactor was maintained at 60° C. Subsequently, 0.2 parts by weight of 3,6,9-triethyl-3,6,9-trimethyl-[1,2,4,5,7,8]hexoxonane as a cyclic polymerization initiator, 0.114 parts by weight of sodium pyrophosphate, 0.15 parts by weight of dextrose, and 0.006 parts by weight of ferrous sulfide were added batchwise to the polymerization reactor to initiate polymerization. Subsequently, polymerization was performed for one hour while maintaining reaction temperature at 60 to 70° C.

<Rubber Core Preparation>

At one hour after polymerization, a mixture including 35 parts by weight of deionized water, 35 parts by weight of butyl acrylate, 0.05 parts by weight of ethylene glycol dimethacrylate as a crosslinking agent, 0.05 parts by weight of allyl methacrylate as a grafting agent, 0.7 parts by weight of sodium lauryl persulfate, 0.1 parts by weight of 3,6,9-triethyl-3,6,9-trimethyl-[1,2,4,5,7,8]hexoxonane as a cyclic polymerization initiator, 0.076 parts by weight of sodium pyrophosphate, 0.1 parts by weight of dextrose, and 0.004 parts by weight of ferrous sulfide was continuously fed into the polymerization reactor over a period of 150 minutes. Here, a reaction temperature was maintained at 70° C. for 120 minutes after elevating to 70° C. over a period of 30 minutes and then.

<Shell Preparation>

After elevating the temperature of the prepared butyl acrylate rubber core to 80° C., a mixture including 30 parts by weight of ion exchanged water, 45 parts by weight of styrene, 15 parts by weight of acrylonitrile, 1.5 parts by weight of potassium rosinate, 0.1 parts by weight of t-butyl peroxide, 0.019 parts by weight of sodium pyrophosphate, 0.025 parts by weight of dextrose, and 0.001 parts by weight of ferrous sulfide was continuously added to the butyl acrylate rubber core over a period of 120 minutes. Here, a reaction temperature was maintained at 80° C.

After termination of the continuous addition, 0.05 parts by weight of t-butyl peroxide, 0.01 parts by weight of sodium pyrophosphate, 0.013 parts by weight of dextrose, and 0.0005 parts by weight of ferrous sulfide were fed batchwise into the polymerization reactor. Temperature was maintained at 80° C. and then aging was performed for one hour, followed by terminating reaction. Here, a polymerization conversion rate was 98.8%.

The prepared graft copolymer resin latex was solidified using 3 parts by weight of calcium chloride, followed by washing and drying. As a result, a powder-type butyl acrylate-styrene-acrylonitrile graft copolymer resin was obtained.

40 parts by weight of the obtained powder-type butyl acrylate-styrene-acrylonitrile graft copolymer resin was mixed with 60 parts by weight of a styrene-acrylonitrile copolymer (Mw=150,000 g/mol) prepared by bulk polymerization. This resultant mixture was extruded by means of a twin-screw extruder (die temperature: 220° C.), thereby preparing a pellet. This pellet was injection-molded, thereby preparing a specimen for testing properties.

Example 2

An experiment was carried out in the same manner as in Example 1, except that, to prepare a butyl acrylate rubber core, 0.3 parts by weight of 3,6,9-triethyl-3,6,9-trimethyl-[1,2,4,5,7,8]hexoxonane, 0.185 parts by weight of sodium pyrophosphate, 0.21 parts by weight of dextrose, and 0.009 parts by weight of ferrous sulfide were used.

Example 3

An experiment was carried out in the same manner as in Example 1, except that, to prepare a butyl acrylate rubber core, 0.5 parts by weight of 3,6,9-triethyl-3,6,9-trimethyl-[1,2,4,5,7,8]hexoxonane, 0.285 parts by weight of sodium pyrophosphate, 0.37 parts by weight of dextrose, and 0.015 parts by weight of ferrous sulfide were used.

Example 4

An experiment was carried out in the same manner as in Example 1, except that, to prepare a butyl acrylate seed and core, 3,3,5,7,7-pentamethyl-1,2,4-trioxepane was used, instead of 3,6,9-triethyl-3,6,9-trimethyl-[1,2,4,5,7,8] hexoxonane, as an initiator.

Example 5

An experiment was carried out in the same manner as in Example 1, except that potassium persulfate (KPS) was used in the same amount instead of the cyclic polymerization initiator to prepare a butyl acrylate seed, and 3,6,9-triethyl-3,6,9-trimethyl-[1,2,4,5,7,8]hexoxonane was used only when a core was prepared.

Comparative Example 1

An experiment was carried out in the same manner as in Example 1, except that, to prepare a seed and rubber core, potassium persulfate (KPS) was used in the same amount instead of the cyclic polymerization initiator.

Comparative Example 2

An experiment was carried out in the same manner as in Example 1, except that potassium persulfate (KPS) was used in the same amount instead of the cyclic polymerization initiator to prepare a seed and rubber core, 0.4 parts by weight of ethylene glycol dimethacrylate and 0.4 parts by weight of allyl methacrylate were respectively used as a crosslinking agent and a grafting agent upon preparation of the seed, and 0.2 parts by weight of ethylene glycol dimethacrylate and 0.2 parts by weight of allyl methacrylate were respectively used as a crosslinking agent and a grafting agent upon preparation of the core.

Comparative Example 3

An experiment was carried out in the same manner as in Example 1, except that, to prepare a seed and rubber core, t-butyl peroxide was used in the same amount instead of the cyclic polymerization initiator.

Comparative Example 4

An experiment was carried out in the same manner as in Example 1, except that t-butyl peroxide was used in the same amount instead of the cyclic polymerization initiator to prepare a seed and rubber core, 0.4 parts by weight of ethylene glycol dimethacrylate and 0.4 parts by weight of allyl methacrylate were respectively used as a crosslinking agent and a grafting agent upon preparation of the seed, and 0.2 parts by weight of ethylene glycol dimethacrylate and 0.2 parts by weight of allyl methacrylate were respectively used as a crosslinking agent and a grafting agent upon preparation of the core.

Test Example

The properties of the butyl acrylate-styrene-acrylonitrile graft copolymer resin prepared according to each of Examples 1 to 5 and Comparative Examples 1 to 4 and the thermoplastic resin composition specimen including the same were measured according to the following methods. Results are summarized in Table 1 below.

Average particle diameter (Å): Measured using intensity Gaussian distribution (Nicomp 380) according to a dynamic laser light scattering method.

Gel content and swelling index measurement: A predetermined amount of dried butyl acrylate-styrene-acrylonitrile copolymer powder, which had been subjected to coagulation, washing, dehydration, and drying, was fed into a bottle, and the bottle was filled with acetone. The powder was dissolved in acetone during a predetermined period, thereby being prepared into a sol-gel state. The prepared sol-gel was fed into a centrifuge, thereby being separated into a sol and a gel. Using the separated gel, a gel content and a swelling index were calculated according to the following equations:

$$\text{Gel content}(\%) = \frac{\text{Amount of dried sample after gel separation}}{\text{Amount of added sample}} \times 100$$

$$\text{Swelling index}(\%) = \frac{\text{Sample after gel separation}}{\text{Dried sample after gel separation}} \times 100$$

Impact strength (¼"; kgf·cm/cm): Measured according to ASTM D256.

TABLE 1

| Classification | | Examples | | | | | Comparative Examples | | | |
|---|---|---|---|---|---|---|---|---|---|---|
| | | 1 | 2 | 3 | 4 | 5 | 1 | 2 | 3 | 4 |
| ASA average particle diameter (Å) | Seed | 580 | 610 | 610 | 590 | 570 | 610 | 590 | 590 | 600 |
| | Core | 980 | 1120 | 1050 | 990 | 1000 | 1020 | 1110 | 970 | 1050 |
| | Shell | 1380 | 1420 | 1410 | 1410 | 1370 | 1410 | 1400 | 1390 | 1420 |
| ASA copolymer | Gel content (%) | 95 | 96 | 97 | 94 | 93 | 92 | 96 | 91 | 95 |
| | Swelling index | 7.3 | 7.5 | 7.4 | 7.3 | 7.3 | 7.3 | 5.3 | 7.2 | 5.8 |
| Resin composition | Impact strength (¼') | 21 | 22.5 | 23 | 21 | 18.5 | 18 | 17 | 17 | 16 |

As shown in Table 1, it can be confirmed that, when Examples 1 to 5, in which an initiator and a crosslinking agent are added in the same amount, are compared with Comparative Examples 1 and 3, Examples 1, 2, and 3 exhibit a similar swelling index and excellent impact strength due to a higher gel content, compared to Comparative Examples 1 and 3.

In addition, it can be confirmed that, examining Comparative Examples 2 and 4 in which a crosslinking agent was added in a larger content than Comparative Examples 1 and 3 so as to increase impact strength, impact strength is decreased due to swelling index decrease, contrary to expectation, although a gel content increases. From these results, it can be confirmed that, although a gel content increases when a crosslinking agent is further added so as to increase impact strength, a swelling index is decreased, and thus, impact strength is somewhat decreased.

In conclusion, when both a gel content and a swelling index are satisfied with regard to rubber particles as in Examples 1, 2, and 3, impact strength and the like are greatly improved. In addition, the cyclic polymerization initiator used in the present disclosure increases impact resistance and the like by satisfying both the gel content and the swelling index according to the present disclosure, thereby providing results satisfying the goals of the present disclosure.

Reference Example

An experiment was carried out in the same manner as in Example 1, except that, to prepare a rubber core, potassium persulfate (KPS) was used in the same amount instead of the cyclic polymerization initiator. Results are summarized in Table 2 below:

TABLE 2

| Classification | | Reference example |
|---|---|---|
| ASA average particle diameter (Å) | Seed | 600 |
| | Core | 1020 |
| | Shell | 1410 |
| ASA copolymer | Gel content (%) | 93 |
| | Swelling index | 7.2 |
| Resin composition | Impact strength (¼') | 18.5 |

As shown in Table 2, it can be confirmed that, when a cyclic polymerization initiator was not used to prepare a core (Reference example), a gel content and impact strength are somewhat decreased, compared to the case in which a cyclic polymerization initiator was used to prepare a core (Example 1).

The invention claimed is:

1. A thermoplastic graft copolymer resin, comprising:
a seed;
an alkyl acrylate rubber core enclosing the seed; and
a shell enclosing the rubber core,
wherein the shell is a non-crosslinked shell, and the thermoplastic graft copolymer resin has a gel content of 93% by weight or more and a swelling index of 6 to 14.

2. The thermoplastic graft copolymer resin according to claim 1, wherein the thermoplastic graft copolymer resin comprises 1 to 20% by weight of the seed, 5 to 40% by weight of the rubber core, and 40 to 90% by weight of the shell based on a total of used monomers.

3. The thermoplastic graft copolymer resin according to claim 1, wherein the seed is a rubber seed.

4. The thermoplastic graft copolymer resin according to claim 3, wherein the rubber seed is a rubber polymer prepared by polymerizing alkyl acrylate, a crosslinking agent, and a grafting agent.

5. The thermoplastic graft copolymer resin according to claim 3, wherein the rubber seed is a rubber polymer prepared by polymerizing alkyl acrylate and a cyclic polymerization initiator.

6. The thermoplastic graft copolymer resin according to claim 1, wherein the rubber core is a rubber polymer prepared by polymerizing alkyl acrylate, a crosslinking agent, and a grafting agent.

7. The thermoplastic graft copolymer resin according to claim 1, wherein the rubber core is a rubber polymer prepared by polymerizing alkyl acrylate and a cyclic polymerization initiator.

8. The thermoplastic graft copolymer resin according to claim 5, wherein a peroxide group of the cyclic polymerization initiator forms a portion of a ring.

9. The thermoplastic graft copolymer resin according to claim 8, wherein the cyclic polymerization initiator comprises one or five peroxide groups.

10. The thermoplastic graft copolymer resin according to claim 5, wherein the cyclic polymerization initiator is one or more selected from the group consisting of dioxylane, 3,6-dichloro-3,6-dimethyl-[1,2,4,5]tetroxane, formaldehyde diperoxide, 3,6-dimethyl-[1,2,4,5]tetroxane, 1,2,4,5,7,8-hexaoxonane, 3,6,9-triethyl-[1,2,4,5,7,8]hexoxonane, 3,6,9-trimethyl-1,2,4,5,7,8-hexaoxonane, 3,6,9-triethyl-3,6,9-trimethyl-[1,2,4,5,7,8]hexoxonane, [1,2,4,6,7,9]hexoxecane, 3,5,8,10-tetramethyl-[1,2,4,6,7,9]hexoxecane, 3,6,9,12-tetramethyl-1,2,4,5,7,8,10,11-octaoxa-cyclododecane, acetone peroxide, 3,3,6,6,9,9,12,12-octamethyl-1,2,4,5,7,8,10,11-octaoxa-cyclododecane, and 3,9-dihexyl-1,2,4,5,7,8,10,11-octaoxa-cyclododecane.

11. The thermoplastic graft copolymer resin according to claim 5, wherein the cyclic polymerization initiator is comprised in an amount of 0.01 to 3 parts by weight based on 100 parts by weight of a total of used monomers.

12. The thermoplastic graft copolymer resin according to claim 4, wherein the crosslinking agent is one or more selected from the group consisting of divinylbenzene, 3-butanediol diacrylate, 1,3-butanediol dimethacrylate, 1,4-butanediol diacrylate, 1,4-butanediol dimethacrylate, allyl acrylate, trimethylolpropane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triallylamine, and diallylamine.

13. The thermoplastic graft copolymer resin according to claim 4, wherein the grafting agent is one or more selected from the group consisting of allyl methacrylate, triallyl isocyanurate, triallylamine, and diallylamine.

14. A thermoplastic resin composition, comprising 5 to 70% by weight of the thermoplastic graft copolymer resin according to claims 1 and 30 to 95% by weight of an aromatic vinyl compound-vinyl cyanide compound copolymer.

15. The thermoplastic graft copolymer resin according to claim 7, wherein a peroxide group of the cyclic polymerization initiator forms a portion of a ring.

16. The thermoplastic graft copolymer resin according to claim 7, wherein the cyclic polymerization initiator is comprised in an amount of 0.01 to 3 parts by weight based on 100 parts by weight of a total of used monomers.

17. The thermoplastic graft copolymer resin according to claim 6, wherein the crosslinking agent is one or more selected from the group consisting of divinylbenzene, 3-butanediol diacrylate, 1,3-butanediol dimethacrylate, 1,4-butanediol diacrylate, 1,4-butanediol dimethacrylate, allyl acrylate, trimethylolpropane triacrylate, tetraethylene glycol diacrylate, ethylene glycol dimethacrylate, diethylene glycol dimethacrylate, triethylene glycol dimethacrylate, neopentyl glycol dimethacrylate, triallyl isocyanurate, triallylamine, and diallylamine.

18. The thermoplastic graft copolymer resin according to claim 6, wherein the grafting agent is one or more selected from the group consisting of allyl methacrylate, triallyl isocyanurate, triallylamine, and diallylamine.

* * * * *